(12) United States Patent
Jesse et al.

(10) Patent No.: US 8,123,851 B2
(45) Date of Patent: Feb. 28, 2012

(54) METHOD OF FINISHING ORGANIC PIGMENTS

(75) Inventors: Joachim Jesse, Weisenheim (DE); Matthias Klueglein, Ludwigshafen (DE); Richard Van Gelder, Speyer (DE); Wolfgang Best, Freinsheim (DE)

(73) Assignee: BASF SE, Ludwigshafen (DE)

( * ) Notice: Subject to any disclaimer, the term of this patent is extended or adjusted under 35 U.S.C. 154(b) by 209 days.

(21) Appl. No.: 12/671,772

(22) PCT Filed: Jul. 30, 2008

(86) PCT No.: PCT/EP2008/059997
§ 371 (c)(1),
(2), (4) Date: Feb. 2, 2010

(87) PCT Pub. No.: WO2009/019180
PCT Pub. Date: Feb. 12, 2009

(65) Prior Publication Data
US 2011/0226160 A1    Sep. 22, 2011

(30) Foreign Application Priority Data
Aug. 3, 2007 (EP) .................... 07113816

(51) Int. Cl.
*C09B 67/04* (2006.01)
*C09B 67/20* (2006.01)
*C09B 67/14* (2006.01)

(52) U.S. Cl. ........ 106/493; 106/412; 106/413; 106/494; 106/495; 106/496; 106/497; 106/498; 106/499

(58) Field of Classification Search ............ 106/412, 106/413, 494, 495, 496, 497, 498, 499
See application file for complete search history.

(56) References Cited

U.S. PATENT DOCUMENTS

| | | | |
|---|---|---|---|
| 3,051,720 A | 8/1962 | Minnich et al. | |
| 3,249,453 A | 5/1966 | Schnoering et al. | |
| 4,088,506 A | 5/1978 | Wetzel | |
| 4,247,695 A | 1/1981 | Fitzgerald | |
| 4,415,333 A | 11/1983 | Schlaefer et al. | |
| 4,455,173 A | 6/1984 | Jaffe | |
| 5,534,055 A * | 7/1996 | Gerson et al. | 106/413 |
| 7,459,016 B2 * | 12/2008 | Brychcy et al. | 106/412 |
| 2010/0043672 A1 * | 2/2010 | Jesse et al. | 106/493 |
| 2010/0050904 A1 * | 3/2010 | Jesse et al. | 106/496 |
| 2010/0286445 A1 * | 11/2010 | Klueglein et al. | 564/180 |

FOREIGN PATENT DOCUMENTS

| | | |
|---|---|---|
| EP | 0 775 703 | 5/1997 |
| GB | 2 043 094 | 10/1980 |
| WO | 92 15405 | 9/1992 |
| WO | 02 00643 | 1/2002 |
| WO | 2004 048482 | 6/2004 |

* cited by examiner

*Primary Examiner* — Anthony J Green
(74) *Attorney, Agent, or Firm* — Oblon, Spivak, McClelland, Maier & Neustadt, L.L.P.

(57) ABSTRACT

A method of finishing an organic pigment by dry-comminuting said pigment in the presence of a sulfonato-functional condensation product of an arylsulfonic acid and at least one aliphatic aldehyde having 1 to 6 C atoms as crystallization modifier, dispersing the resulting mixture of pigment and crystallization modifier in mineral acid, and swelling the pigment in the presence of the crystallization modifier in mineral acid.

11 Claims, No Drawings

METHOD OF FINISHING ORGANIC PIGMENTS

The invention relates to a method of finishing organic pigments using condensation products containing sulfonate groups (sulfonato-functional condensation products). By "sulfonate group" is meant below not only the (acidic) sulfonic acid group —SO₃H but also its salt —SO₃M (M=metal, ammonium).

Organic pigments are frequently obtained from their synthesis in a coarsely crystalline form with a very heterogeneous particle size distribution. For conversion into a coloristically valuable pigment form appropriate to the application, therefore, the crude pigments are typically subjected to a finishing operation.

Known for these purposes is a grinding of the crude pigment and subsequent recrystallization of the ground material from an organic solvent, or the grinding is carried out as wet grinding in aqueous suspension in high-speed agitated ball mills. Although the methods described do achieve—in some cases in a very time-consuming way—a comminution of the particles and hence an improvement in the coloristic properties of the pigments, the particle size of the pigments obtained is difficult to control, and the pigments frequently have a particle size distribution which is inadequate—being too broad—for a range of applications: for example, as colorants for paint applications.

WO 02/00643 discloses a method of finishing crude quinophthalone pigments by subjecting the as-synthesized crude pigment to grinding in the absence of grinding assistants and subsequently crystallizing the ground material obtained from an organic solvent or from a mixture of organic solvent and water in the presence of a quinophthalone derivative. Derivatives specified include, for example, sulfonic acid derivatives of the quinophthalone pigments.

WO 2004/048482 discloses a method of finishing organic pigments by dissolving the pigment in concentrated sulfuric acid and mixing the sulfuric acid solution with water in the presence of a condensation product of naphthalenesulfonic acid and formaldehyde as a crystallization modifier. This crystallization modifier is added prior to the mixing of the sulfuric-acid pigment solution, or is generated in situ therein by reaction of 1- and 2-naphthalenesulfonic acid with formaldehyde. A disadvantage of this in situ synthesis is that it results in condensation products with a broad and poorly defined molecular weight distribution.

In terms of their coloristic properties, their dispersibility, and the viscosity of the paints obtained, the pigments obtained by precipitation from sulfuric acid in the presence of crystallization modifiers do not always satisfy the requirements. It is an object of the invention to provide an advantageous and easy-to-implement method of finishing organic pigments that produces readily dispersible pigments having very good coloristic properties, more particularly a high transparency, and rheological properties.

This object is achieved by a method of finishing an organic pigment by dry-comminuting said pigment in the presence of a sulfonato-functional condensation product of at least one arylsulfonic acid and at least one aliphatic aldehyde having 1 to 6 C atoms as crystallization modifier, dispersing the resulting mixture of pigment and crystallization modifier in mineral acid, and swelling the pigment in the presence of the crystallization modifier in mineral acid.

In one embodiment of the invention the crystallization modifier is a condensation product of one or more naphthalenesulfonic acids, which may have one or more sulfonic acid groups, preferably of 1-naphthalenesulfonic acid, 2-naphthalenesulfonic acid or mixtures thereof, and one or more different aliphatic aldehydes having 1 to 6 C atoms. Preference is given to mixtures of 1-naphthalenesulfonic acid and 2-naphthalenesulfonic acid, in a molar ratio, for example, of 4:1. Condensation is generally carried out with 0.5 to 2 mol of aliphatic aldehyde per mole of naphthalenesulfonic acid present; with particular preference this molar ratio is approximately 1:1.

A preferred aliphatic aldehyde is formaldehyde. With particular preference only formaldehyde is used.

In general the naphthalenesulfonic acids are prepared by sulfonating naphthalene with concentrated sulfuric acid or oleum. To a minor extent in that case it is also possible for polysulfonated products and/or sulfones to be formed and, consequently, to be present in the condensation products as well.

A suitable naphthalenesulfonic acid-formaldehyde condensate may be prepared, for example, as follows:

1 to 3 parts by weight of naphthalene are sulfonated with 1 to 3 parts by weight of a sulfuric acid having a concentration of 85% to 100% by weight or oleum having a free $SO_3$ content of 2% to 45% by weight. The sulfonation can be carried out at temperatures from 80 to 190° C., and the reaction times are from 0.5 to 10 hours. In the sulfonation there may be auxiliaries present such as boric acid, preferably in a concentration of 0.5% to 5% by weight, based on sulfuric acid or oleum, respectively. Following the sulfonation, the reaction mixture is diluted with 0.5 to 2 parts of water and then condensed with 0.3 to 1.8 parts of aqueous formaldehyde solution having a concentration of 20% to 40% by weight formaldehyde, at a temperature of 80 to 180° C. The condensation mixture is subsequently diluted with up to 0.5 part of water and adjusted using aqueous sodium hydroxide solution to a pH of 4 to 10. Finally the condensation mixture is again diluted with 0.5 part of water, aqueous sodium hydroxide solution and milk of lime are added, and precipitating $CaSO_4$ is removed by filtration. Subsequently the pH is adjusted to a value between 4 and 10. Lastly, using water, the final concentration of 15% to 50% by weight dry-matter content is set.

In a further embodiment of the invention the crystallization modifier is a condensation product of one or more different hydroxyarylsulfonic acids and one or more different aliphatic aldehydes having 1 to 6 C atoms. Condensation is generally carried out with 0.25 to 4 mol of aliphatic aldehyde per mole of hydroxyaryl units present. If urea is used as well, then it is employed generally in amounts of 0.25 to 4 mol of urea per mole of hydroxyaryl units present. Besides hydroxyarylsulfonic acid it is possible for one or more different hydroxydiaryl sulfone compounds to be present in condensed form in the condensation product. The preparation of the condensation product may additionally be carried out in the presence of an alkali metal sulfite, preferably sodium sulfite, in which case further sulfonate groups—in addition to the sulfonate groups introduced by the hydroxyarylsulfonic acid—are introduced into the condensation product.

The crystallization modifier may be a condensation product of one or more different hydroxydiaryl sulfone compounds, one or more different aliphatic aldehydes having 1 to 6 C atoms, and an alkali metal sulfite, preferably sodium sulfite. In this case the sulfonate groups are introduced as alkylsulfonate groups into the condensation product. In general the hydroxydiaryl sulfone compound is reacted with 0.5 to 5 mol of the aliphatic aldehyde and 0.4 to 2 mol of the alkali metal sulfite per mole of hydroxydiaryl sulfone compound.

Suitable hydroxyarylsulfonic acids which can be used to prepare the crystallization modifiers employed in accordance with the invention are, for example, hydroxyphenylsulfonic acids or hydroxynaphthylsulfonic acids. They may also have two or more hydroxyl groups. A preferred hydroxyarylsulfonic acid is phenolsulfonic acid.

Suitable hydroxydiaryl sulfone compounds which can be used to prepare the condensation products employed in accordance with the invention are, for example, dihydroxydiphenyl sulfones or—more generally—polyhydroxydiphenyl sulfones and also dihydroxydinaphthyl sulfones or—more generally—polyhydroxydinaphthyl sulfones. A preferred hydroxydiaryl sulfone compound is dihydroxydiphenyl sulfone (DHDPS).

Generally speaking, hydroxyarylsulfonic acids and hydroxydiaryl sulfones are prepared by sulfonating the corresponding hydroxyaryl compounds, naphthols, phenol or polyphenols, for example, using concentrated sulfuric acid or oleum. This generally produces mixtures of hydroxyarylsulfonic acids and hydroxydiaryl sulfones.

By way of example it is possible to use a crystallization modifier obtainable by reacting phenol with concentrated sulfuric acid, with oleum having an $SO_3$ content of 20% to 65% by weight, or with a mixture of sulfuric acid and oleum, the molar ratio of total sulfuric acid, calculated as $SO_3$, to phenol being from 0.7:1 to 1.5:1, at a temperature from 100 to 180° C., to give a mixture comprising phenolsulfonic acid, dihydroxydiphenyl sulfone, and sulfuric acid, or preparing a corresponding mixture by blending the individual components, and then carrying out condensation at 40 to 90° C. with 0.5 to 4 mol of an aliphatic aldehyde having 1 to 6 C atoms, preferably formaldehyde, and—optionally—with 0.25 to 4 mol of urea, per mole of phenol units present.

In a further preferred embodiment a crystallization modifier is used that is obtainable by reacting dihydroxydiphenyl sulfone with 0.5 to 5 mol of an aliphatic aldehyde having 1 to 6 C atoms, preferably formaldehyde, and 0.4 to 2 mol of sodium sulfite per mole of dihydroxydiphenyl sulfone, at a temperature from 90 to 180° C.

It is also possible to use mixtures of the above-described condensation products.

From the solutions obtained it is possible to isolate the sulfonato-functional condensation product, as for example by precipitating the condensation product by adding a water-miscible liquid in which the condensation product is not soluble, or by evaporating the liquid reaction medium, by means of spray drying, for example. Thus the condensation product is ultimately obtained in the form of a solid.

The condensation products act generally as crystallization inhibitors.

It is important that the dry grinding of the pigment be carried out in the presence of the crystallization modifier. The comminution of the pigment in the presence of the crystallization modifier generally takes place by dry grinding of the pigment in the presence of the crystallization modifier. The dry grinding takes place preferably in a continuous or batch ball mill or in a vibratory mill.

The mixture of organic pigment and crystallization modifier that is obtained as a result of dry grinding is subsequently dispersed in mineral acid in order to swell the pigment. The mineral acid used is preferably dilute aqueous sulfuric acid. As a result of the swelling in the presence of the crystallization modifier, larger pigment particles grow at the cost of smaller pigment particles, and/or there is a smoothing/healing of the crystal surfaces of the pigment particles.

The optimum concentration of mineral acid for the swelling of the dry-ground pigment must be adapted in each individual case. Suitable dilute sulfuric acid, however, generally has a concentration of 50% to 85%, preferably 60% to 85% by weight. The swelling of the pigment in the mineral acid, preferably the dilute aqueous sulfuric acid, in the presence of the crystallization modifier takes place in general at temperatures from 15 to 90° C. over a period of in general 0.5 to 24 hours. The optimum swelling conditions can be determined in preliminary experiments for each type of pigment. Further dilution with water may follow. For that purpose, in general, 2 to 6 times the amount of water is added to the sulfuric-acid pigment dispersion. This may be followed by subsequent stirring for 0.5 to 2 hours, for example.

During the swelling operation, the crystallization modifier employed in accordance with the invention is present generally in amounts of 0.1% to 30%, preferably 0.3% to 25%, more preferably 5% to 22%, by weight, based on the amount of pigment.

In certain cases it may be advantageous to use, in addition to the sulfonato-functional condensation products of arylsulfonic acid and aliphatic aldehyde, further crystallization modifiers, dispersants, resins, surfactants or specific polymers. Examples of further crystallization modifiers are sulfonamides or pigment derivatives containing sulfonic acid groups, such as imidazolemethyl- or pyrazolemethylquinacridone pigment sulfonic acids. Examples of suitable surfactants are anionic surfactants such as alkylbenzenesulfonates or alkylnaphthalenesulfonates or alkylsulfosuccinates, cationic surfactants such as quaternary ammonium salts, an example being benzyltributylammonium chloride, or nonionic or amphoteric surfactants such as polyoxyethylene surfactants and alkyl or amidopropyl betaines. Examples of suitable specific polymers are polyacrylic acid, polymethacrylic acid, polyurethanes, polyvinyl alcohol, polyvinylpyrrolidone or cellulose derivatives. Examples of resins are natural resins such as rosin, oligomerized, polymerized, hydrogenated, part-hydrogenated or disproportionated rosin. The additional crystallization modifiers, dispersants, resins, surfactants or specific polymers may be added before or during the dry grinding, during the swelling, or during the further working-up of the pigments. The optimum conditions can be optimized in rangefinding experiments for each pigment.

In a further embodiment of the method of the invention a pigment synergist is added. The pigment synergist is generally a derivative comprising sulfonate groups or carbonate groups, or a basic derivative, of an organic pigment; preferably it is a derivative of the pigment to be finished. The pigment synergist may be added, for example, before or during the comminuting step or before or during the swelling of the pigment. It is also possible for there to be a subsequent aftertreatment step in which the isolated, dry, ready-finished pigment is additionally ground in the presence of the pigment synergist.

In a further embodiment of the invention, in addition to the crystallization modifier or modifiers, an additive which enhances the solubility of the pigment may be present during the swelling step. Generally speaking an organic solvent is added as the solubility enhancer additive. Suitable organic solvents are, for example, xylenes, glycols, alcohols, THF, acetone, NMP, DMF, and nitrobenzene. Based on the aqueous pigment suspension, these solvents are added generally in an amount of 0.1% to 50% by weight. The amount of crystallization modifier is generally 0.1% to 30% by weight, based on the aqueous pigment suspension (without organic solvent). In general the suspension is stirred in the presence of the organic solvent at temperatures in the range from 15° C. to boiling temperature, and the organic solvent is distilled off afterward.

In all cases the pigment crystallized in the presence of the crystallization modifier is subsequently isolated as a solid from the aqueous suspension by filtration.

Suitable pigments which can be finished by the method of the invention are, for example, phthalocyanines, perylenes, quinacridones, indanthrones, quinophthalones, dioxazines, and diketopyrroles, preferably indanthrones and perylenes.

Preferred among the perylenes are the pigments of the C.I. Pigment Red 179 type. These pigments can be prepared by a variety of processes. For instance, C.I. Pigment Red 179 can be prepared by methylating perylene-3,4,9,10-tetracarboxylic diimide with a methylating agent or by condensing perylenetetracarboxylic anhydride with methylamine. The latter process is used with preference. An alternative is to use mixtures of the pigments prepared by these two methods. It is also possible to use pigment derivatives prepared by these methods, or mixtures of said derivatives.

The average particle size of the finished pigments is generally in the range from 10 to 400 nm, preferably 20 to 200 nm.

The pigments finished by the method of the invention may comprise the crystallization modifier on the surface of the pigment particles. In addition to the pigment synergists already specified, the pigment preparations may comprise further additives, generally in amounts of up to 20% by weight. Examples of further additives are wetting agents, surfactants, antifoams, antioxidants, UV absorbers, stabilizers, plasticizers, and texturing auxiliaries.

The invention is illustrated by the examples below.

EXAMPLES

The pigment preparations of the invention are tested in an aqueous varnish system.

For this purpose, first of all, an aqueous tinting paste based on a water-dilutable polyurethane resin is prepared. 100 g of the polyurethane resin dispersion described in example 1.3 of WO-A 92/15405, 30 g of the pigment preparation, and 50 g of water are suspended, and the suspension is adjusted to a pH of 8 using dimethylethanolamine and ground in a ball mill (loaded with 1.0-1.6 mm SAZ beads [SAZ=silicon/aluminum/zirconium oxide]) for 4 h.

In the 2nd step, 34 g of this aqueous tinting paste (15% by weight based on pigment) are added to 225 g of a polyurethane-based mixing varnish (described in example 3 of WO-A 92/15405). Following the addition of 7.5 g of water, a pH of 8 is set using aminoethanol. The suspension obtained is stirred with a propeller stirrer at 1000 rpm for 15 minutes.

The aqueous basecoat materials produced are used as a basis for preparing metallic coating materials, which are applied by spraying.

The crystallization modifier used was Tamol® NN9401, a naphthalenesulfonic acid/formaldehyde condensation product having a molecular weight in the range from 5000 to 10 000 g/mol.

Comparative Example 1

100 g of perylene-3,4,9,10-tetracarboxylic acid N,N'-dimethyl diimide (C.I. Pigment Red 179, formula no. 71130) are ground in a jacketed ball mill charged with 1.5 kg of steel balls at 50° C. for 50 hours.

30 g of the ground pigment are swollen in 300 g of 76% strength sulfuric acid at room temperature for 16 hours. The batch is subsequently diluted with 1.5 l of ice-water, stirred for 30 minutes, and filtered, and the filter product is washed to neutrality and ground together with 2.25 parts of a perylene compound containing sulfonic acid groups (prepared according to example 3 of EP 0 486 531 B1).

Comparative Example 2

90 g of perylene-3,4,9,10-tetracarboxylic acid N,N'-dimethyl diimide (C.I. Pigment Red 179, formula no. 71130) and 10 g of resin (Dertopol) are ground in a jacketed ball mill charged with 1.5 kg of steel balls at 50° C. for 50 hours.

30 g of the ground pigment are swollen in 300 g of 76% strength sulfuric acid at room temperature for 16 hours. The batch is subsequently diluted with 1.5 l of ice-water, stirred for 30 minutes, and filtered, and the filter product is washed to neutrality and ground together with 2.25 parts of a perylene compound containing sulfonic acid groups (prepared according to example 3 of EP 0 486 531 B1).

Inventive Example 1

80 g of perylene-3,4,9,10-tetracarboxylic acid N,N'-dimethyl diimide (C.I. Pigment Red 179, formula no. 71130), 10 g of resin (Dertopol), and 10 g of a naphthalenesulfonic acid-formaldehyde condensation product having a molecular weight in the range from 5000 to 10 000 g/mol (Tamol NN9401, BASF) are ground in a jacketed ball mill charged with 1.5 kg of steel balls at 50° C. for 50 hours.

30 g of the ground pigment are swollen in 300 g of 76% strength sulfuric acid at room temperature for 16 hours. The batch is subsequently diluted with 1.5 l of ice-water, stirred for 30 minutes, and filtered, and the filter product is washed to neutrality and ground together with 2.25 parts of a perylene compound containing sulfonic acid groups (prepared according to example 3 of EP 0 486 531 B1).

The preparation produced according to inventive example 1 has very good dispersibility and outstanding rheological properties in water-thinnable varnish systems. On account of the significantly higher transparency as compared with the pigment from comparative example 1 or with the preparation from comparative example 2, the pigment from inventive example 1 is especially suitable for pigmenting metallic paints.

Comparative Example 3

70 g of indanthrone pigment C.I. P.B. 60 (formula no.: 69 800) are ground in a jacketed ball mill charged with 1.5 kg of steel balls at 50° C. for 20 h.

30 g of the ground pigment are swollen in 300 g of 75% strength sulfuric acid at room temperature for 5 h. The batch is subsequently diluted with 480 ml of ice-water, stirred for 30 minutes, and filtered, and the filter product is washed to neutrality and ground.

Inventive Example 2

63 g of indanthrone pigment C.I. P.B. 60 (formula no.: 69 800) and 7 g of a naphthalenesulfonic acid-formaldehyde condensation product having a molecular weight in the range of 5000-10 000 g/mol (Tamol® NN9401 from BASF AG, Ludwigshafen, Del.) are ground in a jacketed ball mill charged with 1.5 kg of steel balls at 50° C. for 20 h.

30 g of the ground mixture are swollen in 300 g of 75% strength sulfuric acid at room temperature for 5 h. The batch is subsequently diluted with 480 ml of ice-water, stirred for 30 minutes, and filtered, and the filter product is washed to neutrality and ground.

Inventive Example 3

56 g of indanthrone pigment C.I. P.B. 60 (formula no.: 69 800), 7 g of a naphthalenesulfonic acid-formaldehyde condensation product having a molecular weight in the range of 5000-10 000 g/mol (Tamol NN9401 from BASF AG, Ludwigshafen, Del.), and 7 g of resin (Dertopol®, DRT) are ground in a jacketed ball mill charged with 1.5 kg of steel balls at 50° C. for 20 h.

30 g of the ground mixture are swollen in 300 g of 75% strength sulfuric acid at room temperature for 5 h. The batch is subsequently diluted with 480 ml of ice-water, stirred for 30 minutes, and filtered, and the filter product is washed to neutrality and ground.

The preparations produced according to inventive examples 2 and 3 have very good dispersibility and outstanding rheological properties in water-thinnable varnish systems. On account of the significantly higher transparency as compared with the pigment from comparative example 3, these pigments are especially suitable for pigmenting metallic paints.

The transparency is determined on applied films (drawdowns) on sheet metal over a black ground:

P.R. 179 (comparative examples 1 and 2, inventive example 1) with wet film thickness of 100 μm and 15% pigmentation;

P.B. 60 (comparative example 3 and inventive examples 2 and 3) with wet film thickness of 50 μm and 17% pigmentation.

The CIELAB color difference delta E* between the measured paint film over a black ground and an ideal black gives a dimensional number (scattering delta E*) for the transparency. The determination of the color difference delta E* in the CIELAB color space is described in DIN 6174. The smaller this dimensional number for a given film thickness and pigmentation, the higher the transparency.

The scattering delta E* values of the coating films formed from the inventive and comparative examples are shown by table 1 below:

TABLE 1

| Coating film | Scattering delta E* |
| --- | --- |
| Comparative example 1 | 42.20 |
| Comparative example 2 | 39.52 |
| Inventive example 1 | 25.56 |
| Comparative example 3 | 9.78 |
| Inventive example 2 | 8.83 |
| Inventive example 3 | 7.35 |

The invention claimed is:

1. A method of finishing an organic pigment comprising:
   dry-comminuting an organic pigment in the presence of a sulfonato-functional condensation product of an arylsulfonic acid and at least one aliphatic aldehyde having 1 to 6 C atoms as crystallization modifier;
   dispersing the resulting mixture of pigment and crystallization modifier in mineral acid; and
   swelling the pigment in the presence of the crystallization modifier in mineral acid to obtain a swollen pigment.

2. The method according to claim 1, wherein the crystallization modifier is a condensation product of naphthalenesulfonic acid and formaldehyde.

3. The method according to claim 1, wherein the crystallization modifier is a condensation product of at least one hydroxyarylsulfonic acid or at least one hydroxydiaryl sulfone compound, or mixtures thereof, and at least one aliphatic aldehyde having 1-6 C atoms, optionally urea, and, if appropriate, an alkali metal sulfite, or mixtures of such condensation products.

4. The method according to claim 1, wherein the swelling of the pigment is carried out in the presence of further crystallization modifiers, dispersants, surfactants or specific polymers.

5. The method according to claim 1, further comprising adding a pigment synergist.

6. The method according to claim 5, wherein the pigment synergist is added before or during said dry-comminuting or before or during said swelling of the pigment.

7. The method according to claim 5, further comprising isolating and drying said swollen pigment to obtain an finished pigment, and grinding said finished pigment in the presence of the pigment synergist.

8. The method according to claim 5, wherein the pigment synergist is a derivative comprising sulfonate groups or carbonate groups, or a basic derivative, of the finished pigment.

9. The method according to claim 1, wherein an additive which enhances the solubility of the pigment is present alongside the crystallization modifier or modifiers during said swelling.

10. The method according to claim 9, wherein the solubility enhancer additive is an organic solvent.

11. The method according to claim 1, wherein the organic pigment is at least one selected from the group consisting of phthalocyanine, perylene, quinacridone, indanthrone, quinophthalone, dioxazine, and diketopyrrole.

* * * * *